(12) United States Patent
Cheng

(10) Patent No.: US 11,199,176 B1
(45) Date of Patent: Dec. 14, 2021

(54) VERTICAL TURBINE SYSTEMS

(71) Applicant: Kan Cheng, Newark, CA (US)

(72) Inventor: Kan Cheng, Newark, CA (US)

(73) Assignee: Kan Cheng, Newark, CA (US)

( * ) Notice: Subject to any disclaimer, the term of this patent is extended or adjusted under 35 U.S.C. 154(b) by 0 days.

(21) Appl. No.: 17/467,109

(22) Filed: Sep. 3, 2021

(51) Int. Cl.
| | |
|---|---|
| *F03D 3/00* | (2006.01) |
| *F03D 15/00* | (2016.01) |
| *F03D 9/25* | (2016.01) |

(52) U.S. Cl.
CPC ............. *F03D 15/00* (2016.05); *F03D 3/005* (2013.01); *F03D 9/25* (2016.05); *F05B 2260/4021* (2013.01); *F05B 2260/4023* (2013.01); *F05B 2260/40311* (2013.01)

(58) Field of Classification Search
CPC .......... F03D 3/005; F03D 3/067; F03D 3/068; F03D 15/00; F05B 2260/4021; F05B 2260/72; F05B 2260/78
See application file for complete search history.

(56) References Cited

U.S. PATENT DOCUMENTS

| | | | | |
|---|---|---|---|---|
| 69,374 | A | * | 10/1867 | Thornton ................. F03D 3/068 416/17 |
| 2,258,699 | A | * | 10/1941 | Calvo-Mackenna .... B63H 1/08 415/24 |
| 4,032,257 | A | * | 6/1977 | de Haas ................... F03D 3/068 416/117 |
| 5,876,181 | A | | 3/1999 | Shin |
| 7,021,042 | B2 | | 4/2006 | Law |
| 7,436,083 | B2 | | 10/2008 | Shibata et al. |
| 7,789,793 | B2 | * | 9/2010 | Koleoglou .............. F03D 15/10 475/344 |
| 8,277,167 | B2 | | 10/2012 | Shibata et al. |
| 8,680,705 | B2 | | 3/2014 | Artigas |
| 10,744,566 | B2 | | 8/2020 | Clarke |

FOREIGN PATENT DOCUMENTS

| | | |
|---|---|---|
| GB | 2464132 A | 4/2010 |
| GB | 2468863 A | 9/2010 |
| KR | 101483461 | 1/2015 |

* cited by examiner

*Primary Examiner* — Ninh H. Nguyen

(74) *Attorney, Agent, or Firm* — Robert Moll

(57) ABSTRACT

A vertical turbine comprising a blade control mechanism including a sun gear engaging a plurality of planetary gears each coupled to blade assemblies. The sun gear has at least half circumference of its teeth removed, as the turbine receives maximum downstream torque in the circumference with teeth and it leaves blades free to rotate in the circumference without teeth for minimum upstream drag. The turbine converts the rotational blades into parallel movement and unidirectional propulsion with minimum turbulence.

14 Claims, 9 Drawing Sheets

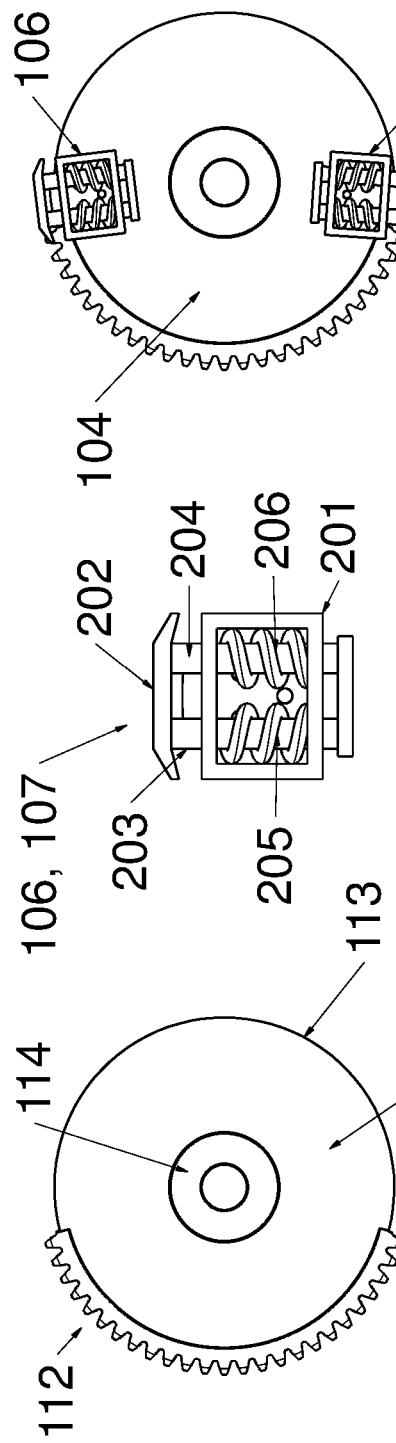
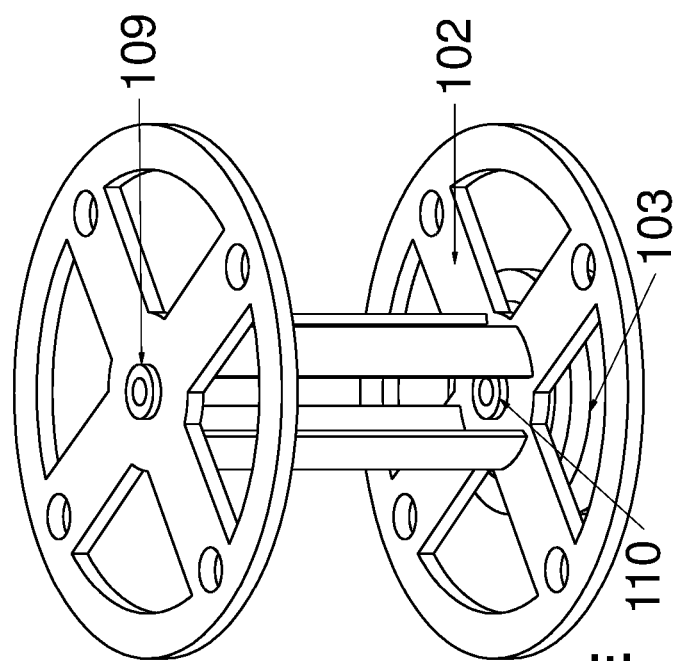
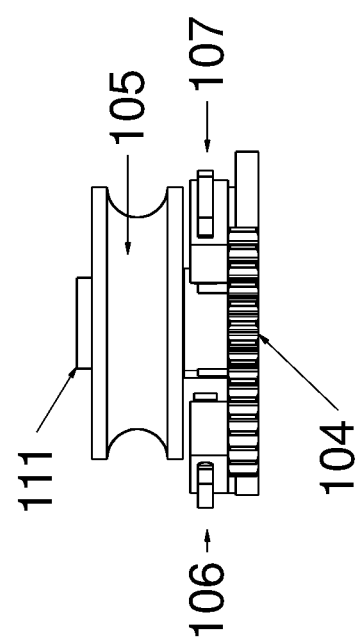

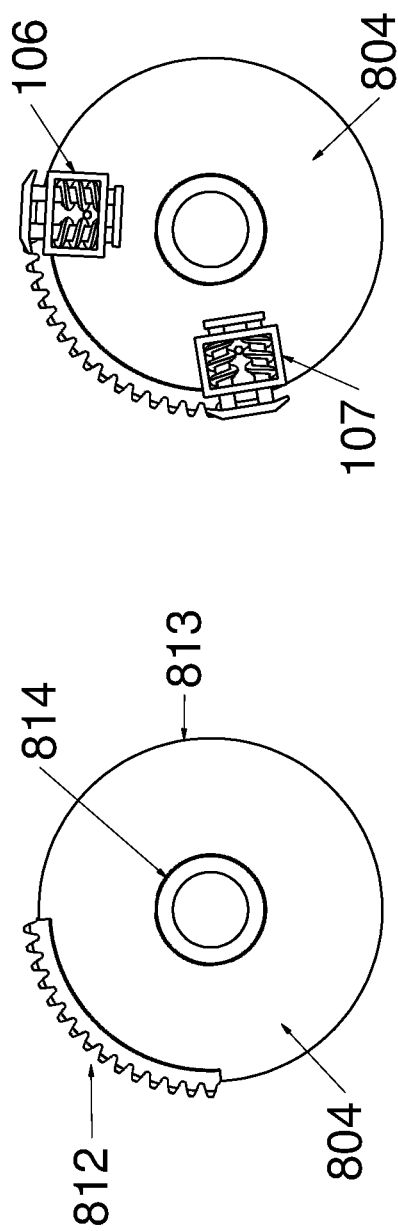
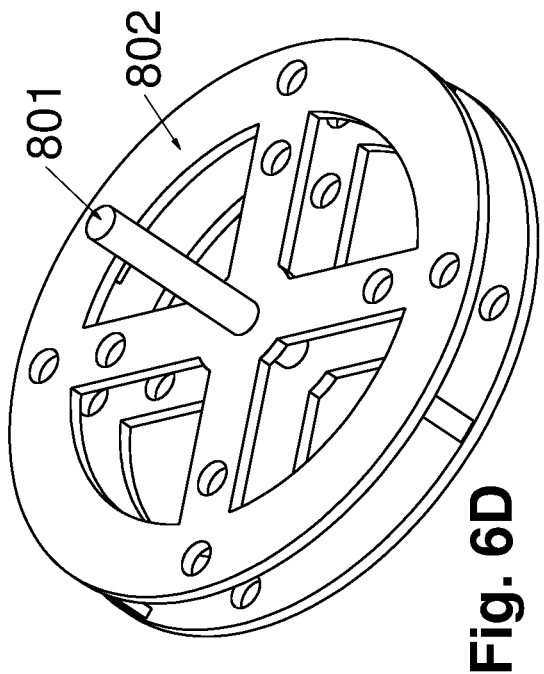
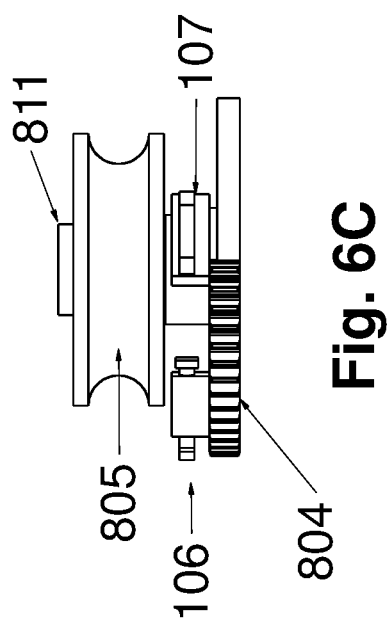
Fig. 6A
Fig. 6B
Fig. 6C
Fig. 6D

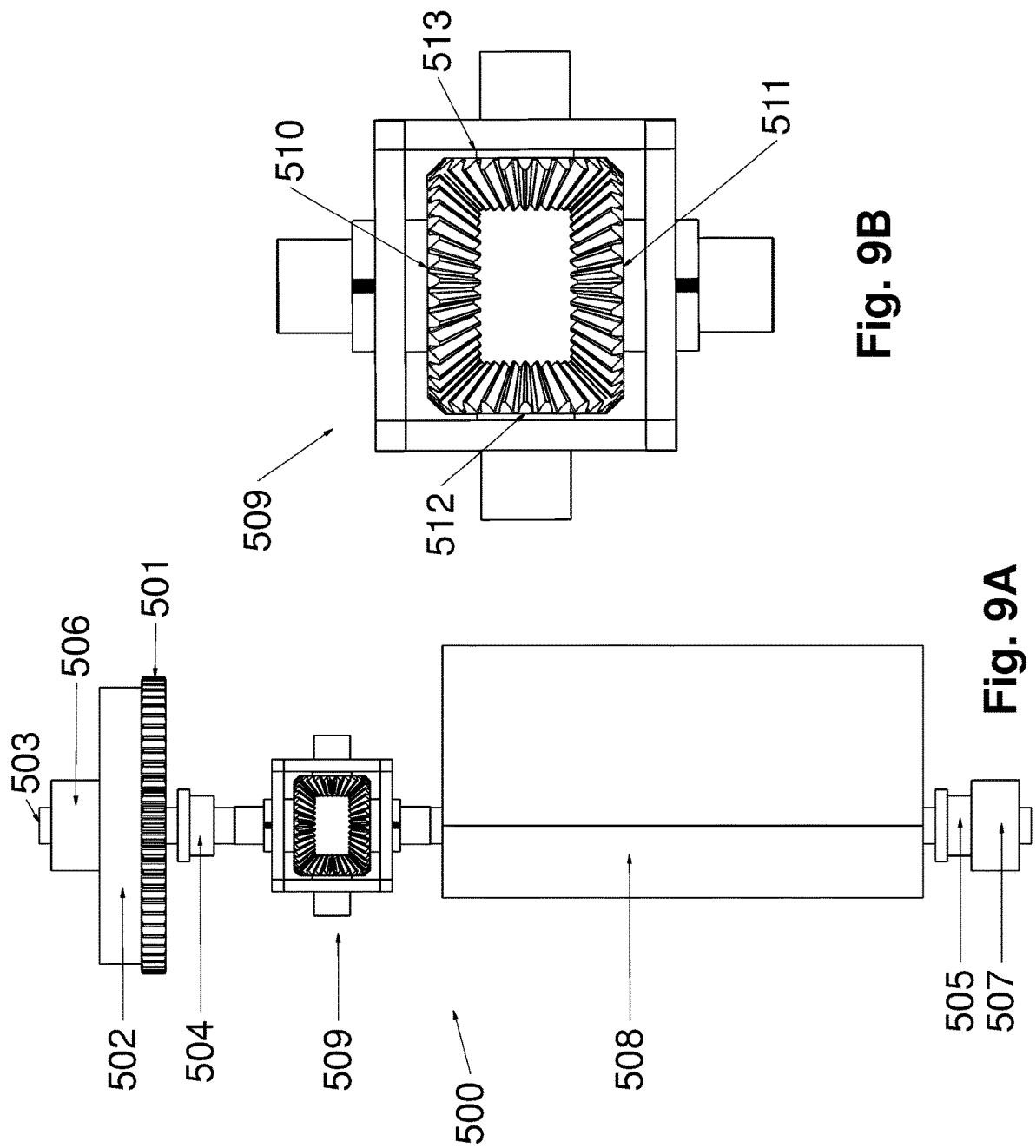

VERTICAL TURBINE SYSTEMS

BACKGROUND

The invention relates to vertical turbines that can be used in several applications.

A vertical turbine can be used to convert wind energy into electrical power. Wind turbines are manufactured with horizontal or vertical axes. Both types are important sources of renewable energy. A vertical turbine is compact because its rotating axis is perpendicular to the ground. This compact nature allows the vertical turbine to be used in small settings (e.g., residential). However, a vertical turbine has lower efficiency than a horizontal turbine, because a vertical turbine has some blades rotating downstream and others rotating upstream. The output torque generated by a vertical turbine is the downstream torque minus upstream torque, while all the blades of the horizontal turbine contribute to the output and do not generate upstream resistance. Thus, there is a need for a more efficient vertical turbine for generating power from wind energy.

A vertical turbine can be also used as a propeller to convert rotational motion to eject fluid. When a vertical turbine is used as a propeller, the rotating blades propel a vessel forward (useful energy) and generate turbulence. This turbulence wastes energy that leads to greater fuel consumption. Thus, there is a need for a more efficient vertical turbine for propeller applications.

SUMMARY OF THE INVENTION

The invention relates to vertical turbines suitable for a variety of applications. In converting wind energy into power, the vertical turbine, includes a shaft, a rotor adapted to rotate on the shaft, and a blade control mechanism that includes a sun gear adapted to rotate on the shaft, where the sun gear has teeth removed on part of the circumference, and a direction control pulley secured to the sun gear. A plurality of blade assemblies rotatably mounted on the rotor, and each blade assembly includes a planetary gear; and a blade coupled to the planetary gear, wherein the planetary gears engage the sun gear teeth and disengage from the sun gear on part of the circumference without teeth.

The vertical turbine may include features such an output pulley attached to the rotor to drive a generator, a sun gear that has at least half of the teeth removed on part of the circumference, each planetary gear that has an upper wall and a sun gear that has an entry clutch for braking on contact of the upper wall at the start of engagement and an exit clutch for releasing the planetary gear at disengagement, each blade assembly maximizing torque when the sun gear engages the planetary gear and minimizing drag when the sun gear disengages from the planetary gear, and a direction control pulley secured to the sun gear is positioned with respect to fluid direction to maximize power generated at the output pulley. Each blade is aligned along an axis that defines a leading surface area and tail surface area, wherein the tail surface area exceeds the leading surface area, and the diameter of the sun gear is equal to that of the planetary gears. In operating as a propeller, the sun gear preferably has at least three fourths of the teeth removed on part of the circumference, the blade is a propeller blade that ejects fluid when rotor is driven, the rotor shaft is secured to the rotor, and each blade coupled to the planetary gear includes a transmitting gear secured to the planetary gear that engages a receiving gear secured to the blade, and/or the diameter of the transmitting gear is equal to the diameter of receiving gear.

BRIEF DESCRIPTION OF THE DRAWINGS

FIG. 2A shows a sun gear suitable for use in a blade control mechanism.

FIG. 2B illustrates an embodiment of a clutch that is useful for an entry clutch and an exit clutch.

FIG. 2C illustrates an embodiment of an assembly of the entry clutch and the exit clutch extending from the sun gear.

FIG. 2D is a side view of an embodiment of the direction control pulley extending from a sun gear and an entry clutch and an exit clutch.

FIG. 2E is a perspective view of the turbine rotor with an upper bearing and a lower bearing.

FIG. 6A shows another embodiment of the sun gear partly shown in FIG. 5.

FIG. 6B illustrates another embodiment of an assembly of an entry clutch and an exit clutch extending from the sun gear.

FIG. 6C is a side view of another embodiment of the direction control pulley extending from the hub of the sun gear, and the entry clutch and the exit clutch.

FIG. 6D illustrates another embodiment of the rotor with a drive shaft.

FIG. 9A is a side view of another embodiment of a blade assembly.

FIG. 9B is a side view of 1-to-1 inline reverse gear box.

DETAILED DESCRIPTION OF THE PREFERRED EMBODIMENTS

The following description includes the best mode of carrying out the invention. The detailed description illustrates the principles of the invention and should not be taken in a limiting sense. The scope of the invention is determined by reference to the claims. Each part is assigned its own part number throughout the specification and drawings.

Figure 1:
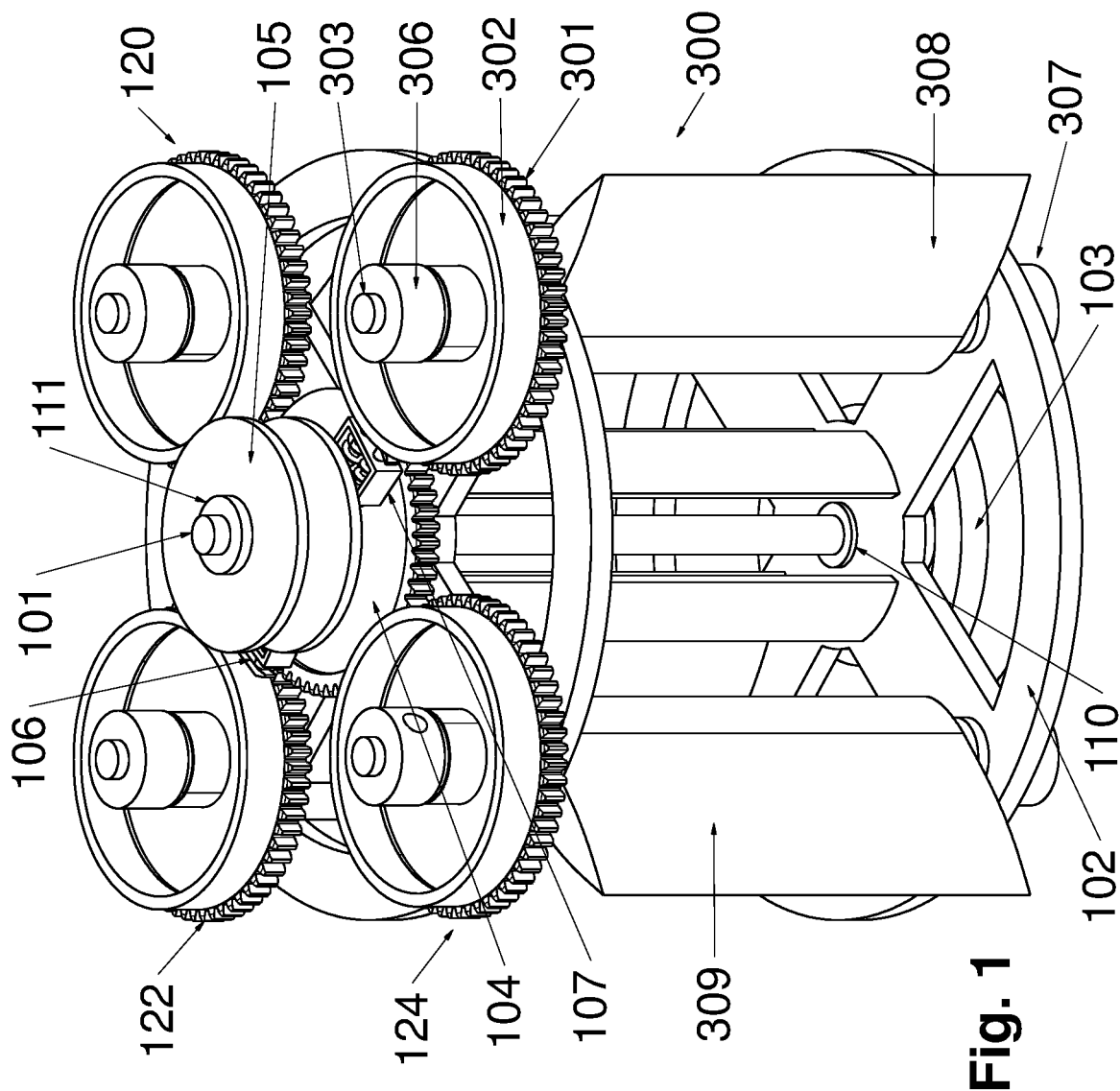
FIG. 1 shows an embodiment of a vertical turbine.

FIG. 1 shows a perspective view of an embodiment of a vertical turbine. The vertical turbine includes a turbine rotor 102 that rotates about a stationary center shaft 101. FIG. 2E illustrates the turbine rotor 102.

As shown FIG. 2E, the turbine rotor 102 has an upper rotor bearing 109 on the top surface and a lower rotor bearing 110 on the bottom surface. The top surface has four mounting holes positioned above four mounting holes on the bottom surface.

As shown in FIG. 1, the vertical turbine has a blade control mechanism that includes a sun gear 104 that engages four planetary gears 120, 122, 124, and 301. FIG. 2A illustrates an embodiment of the sun gear 104.

Referring FIGS. 1 and 2C, the sun gear 104 includes an entry clutch 106 and an exit clutch 107. A direction control pulley 105 rotates about the shaft 101 on a bearing 111 and adjusts the position of the sun gear 104 to the optimal position for delivery of power at the output pulley 103.

Referring again to FIG. 1, the vertical turbine includes four blade assemblies that are rotatably mounted in the four holes of top and bottom surfaces of the turbine rotor 102 shown in FIG. 2E. (Blade assembly 300 and 309 are shown but hide the other two blade assemblies).

Figure 3:
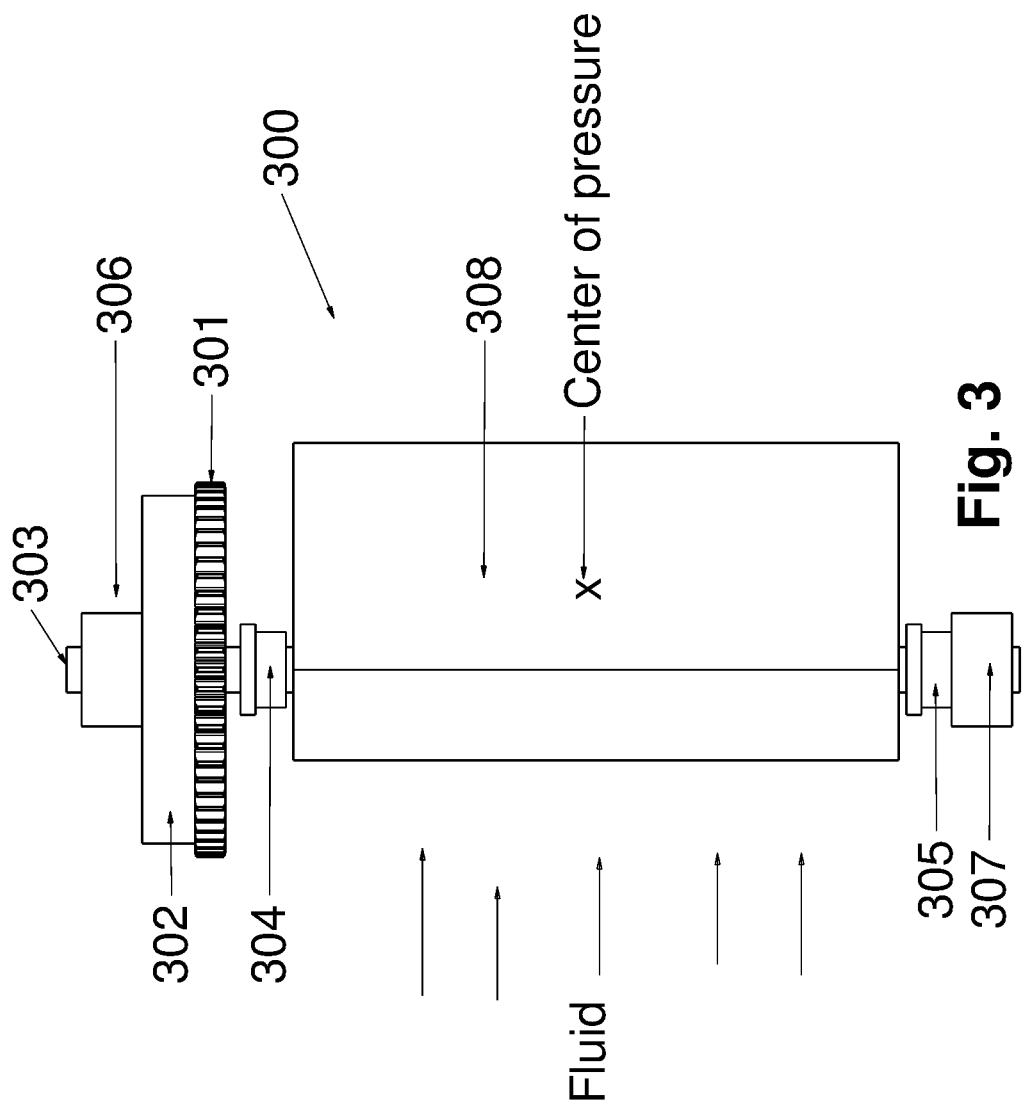
FIG. 3 is a side view of an embodiment of a blade assembly. This embodiment is useful for a turbine.

The blade assembly 300 is representative of the four blade assemblies and includes a planetary gear shaft 303 secured to an upper end unit 306, an upper wall 302, a planetary gear 301, a turbine blade 308 secured to the planetary gear shaft 303, and a lower end unit 307. FIG. 3 illustrates further details of a single blade assembly 300.

Referring to FIG. 1, each of the planetary gears 120, 122, 124, and 301 is attached to a blade assembly. Thus, planetary gear 301 is attached to the blade assembly 300 as shown in FIG. 3.

Figure 4:
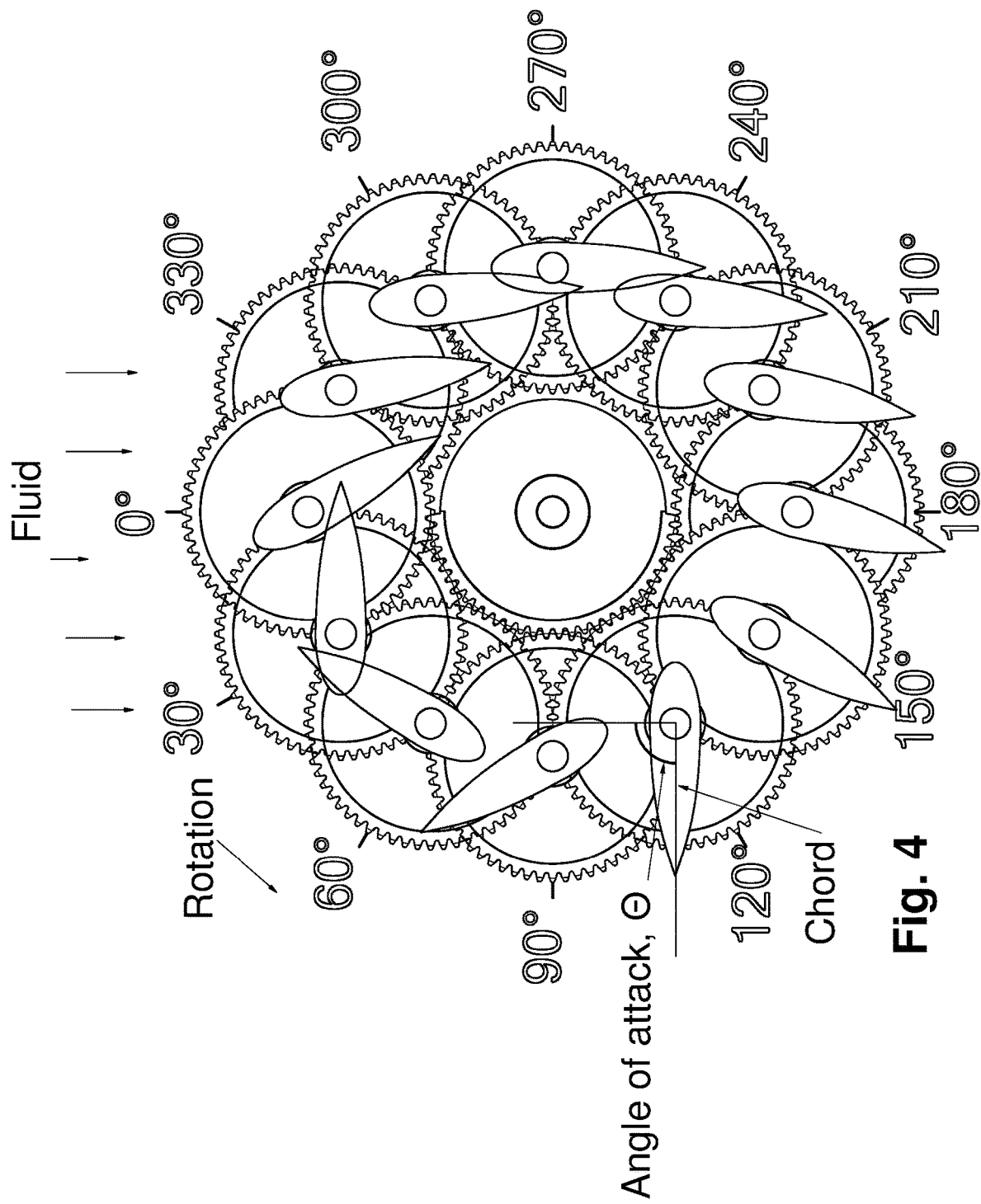
FIG. 4 is a top view of blade control mechanism with the blades at various angles when the planetary gears rotate around the sun gear. This embodiment is useful for a turbine.

FIG. 2A shows a sun gear 104 with a hub 114 and gear teeth 112 and a smooth circumference 113. The gear teeth 112 will engage the planetary gears, while the smooth circumference (having no gear teeth) makes no contact with the planetary gears as shown in FIG. 4. In the embodiment, the sun gear has at least half of the gear teeth removed.

FIG. 2B illustrates the details of an embodiment of a clutch that is useful for the entry clutch 106 and an exit clutch 107. As shown, clutch 106 and clutch 107 each include a contact shoe 202, a spring 205 around a beam 203, a spring 206 around a beam 204, and inside a clutch housing 201.

FIG. 2C illustrates an embodiment of an assembly of the entry clutch and exit clutch extending from the sun gear 104. The contact shoe 202 of the entry clutch 106 contacts an upper wall (FIG. 1) to smoothly brake when the planetary gear 301 initial engages with the teeth of the sun gear 104. The contact shoe 202 of the exit clutch 107 contacts the upper wall to smoothly release when the planetary gear disengages from the teeth of the sun gear 104.

FIG. 2D is a side view of an embodiment of the direction control pulley 105 with a bearing 111 rotatably disposed on the shaft 101. The sun gear 104 is secured to the pulley 105 and the entry clutch 106 and the exit clutch 107.

FIG. 3 is a side view of an embodiment of a blade assembly 300. This embodiment is useful for a turbine. The blade assembly 300 includes a planetary gear shaft 303 secured to upper end unit 306. The upper wall 302 extends from the planetary gear 301. An upper bearing 304 and a lower bearing 305 rotatably engage the planetary gear shaft 303. The turbine blade 308 is secured to the planetary gear shaft 303 and the lower end unit 307. As shown, a fluid (e.g., a gas such as air or liquid such as water) is directed to the turbine blade 308.

FIG. 4 is a top view when a planetary gear rotates counterclockwise around the sun gear. FIG. 4 simulates the position of the planetary gear at various angles (e.g., 30°, 60°, 90°, etc.). As shown in FIG. 4, as planetary gear engages the teeth of sun gear, the turbine blade changes its angle with respect to the fluid incident on the turbine blade. In a preferred embodiment, the planetary gear and sun gear have equivalent diameters. As shown, when the planetary gear rotates 30° with respect to the sun gear, because of the engagement of the planetary gear and the sun gear teeth the turbine blade will rotate an additional 30° with respect to the turbine blade at 0°.

The torque generated by each turbine blade at each angle is expressed:

$$\text{Torque} = D \times \text{normal force} \times \sin\Theta$$

Where:
D=distance between the center of pressure of the turbine blade and axis of the sun gear. Note the center of pressure is shown in FIG. 3.
Normal force=fluid stream normal x turbine blade surface
$\Theta$=angle of attack between the fluid stream and the chord of the turbine blade Based on above analysis and shown in FIG. 4, the turbine blade will provide torque as it rotates counterclockwise from 0° to 180°, and the magnitude of a generated torque relates to Sin $\Theta$.

As shown in FIG. 4, the turbine blade freely rotates since the smooth circumference of sun gear is disengaged from planetary gear as it rotates further counterclockwise from 180° to 360°. Further, the turbine blade has the smallest surface area towards the incident fluid and minimizes the drag.

To stop the vertical turbine, the sun gear can be shifted up from its location and disengage with the planetary gears. The disengagement of sun gear from the planetary gears in the smooth circumference of the sun gear will leave all blade assemblies free to rotate with minimum drag.

Figure 5:
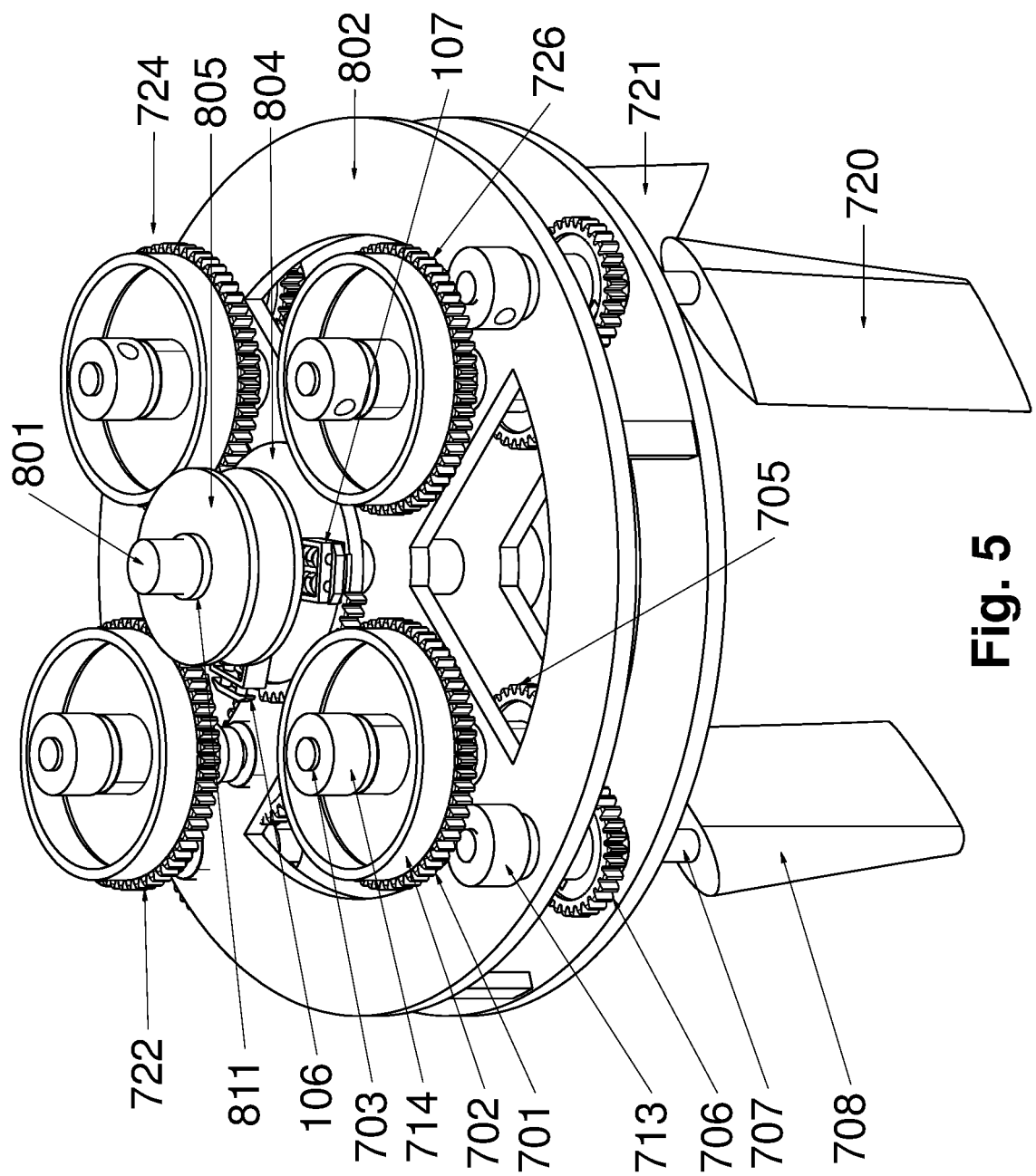
FIG. 5 shows another embodiment of the vertical turbine.

FIG. 5 shows a perspective view of an embodiment of a vertical propeller. The vertical propeller includes a shaft 801 fixed at the center of the rotor 802. FIG. 6D illustrates an embodiment of the shaft 801 and the rotor 802.

As shown FIG. 6D, the rotor 802 has a top surface with four pairs of mounting holes positioned above four pairs of mounting holes on a bottom surface.

As shown in FIG. 5, the vertical propeller has a blade control mechanism that includes a sun gear 804 that engages four planetary gears 701, 722, 724, and 726. FIG. 6A illustrates an embodiment of the sun gear 804.

Referring FIGS. 5 and 6B, the sun gear 804 includes an entry clutch 106 and an exit clutch 107. As shown in FIG. 5, the direction control pulley 805 rotates about the shaft 801 on a bearing 811 and can adjust the position of the sun gear 804 to optimally position the direction of fluid ejection from the blades.

Figure 7:
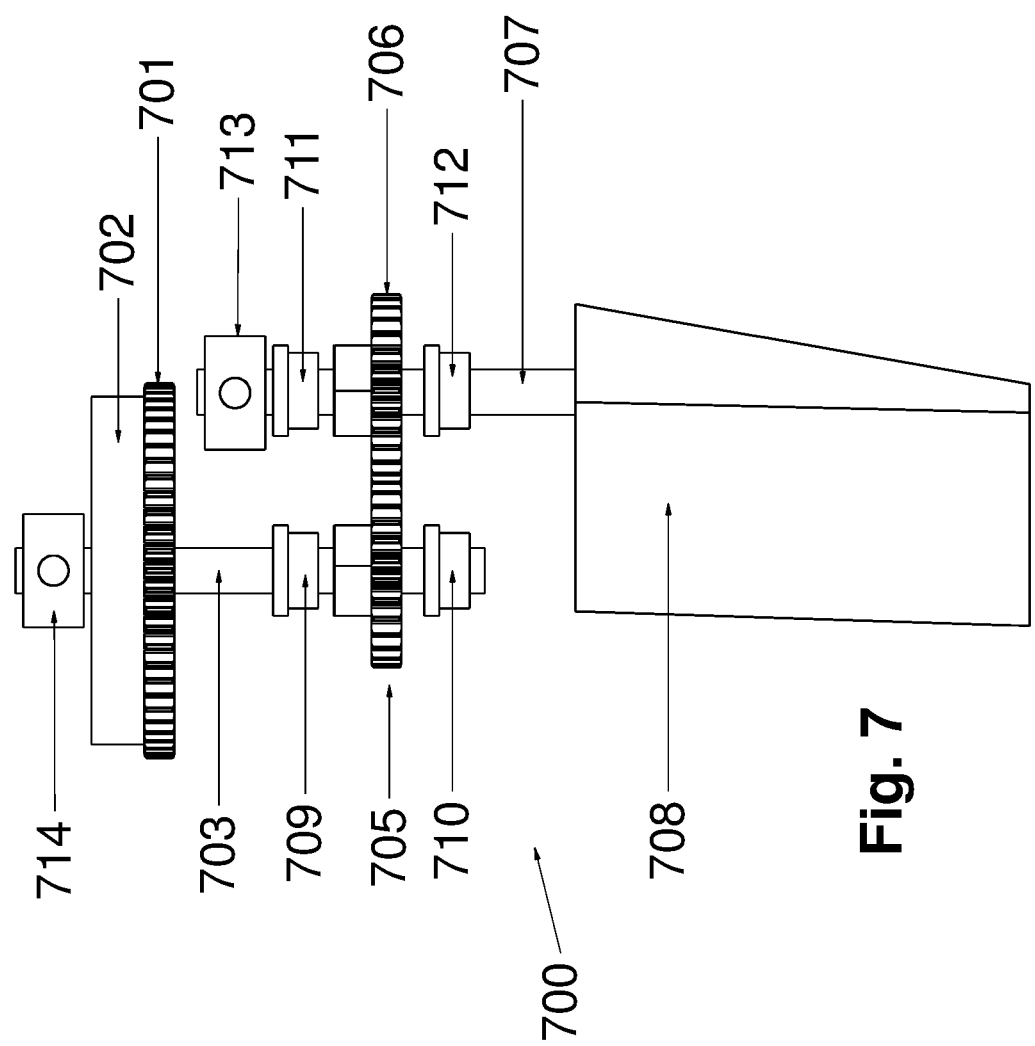
FIG. 7 is a side view of another embodiment of a blade assembly.

Referring again to FIG. 5, the vertical propeller includes four blade assemblies as shown in FIG. 7 that are rotatably mounted in the four pairs of mounting holes in the top and bottom surfaces of the rotor 802 shown in FIG. 6D. (Blade assemblies 708 and 720 are shown. Blade 721 is partly shown, and the fourth blade secured to the planetary gear 722 hidden behind the rotor 802.

Referring to FIG. 5, each of the planetary gears 701, 722, 724, and 726 is attached to a blade assembly.

FIG. 6A shows a sun gear 804 with a hub 814 and gear teeth 812 and a smooth circumference 813. The gear teeth 812 engage planetary gears, while the smooth circumference (having no gear teeth) makes no contact with the planetary gears.

FIG. 6C illustrates an embodiment of an assembly of the direction control pulley 805 fixed to a bearing 811 and rotatably disposed about the shaft 801 as shown FIG. 6D. The sun gear 804 is secured to the pulley 805 and the entry clutch 106 and the exit clutch 107 extending from the sun gear 804 perform the braking and releasing functions described in connection with FIG. 2C.

FIG. 7 is a side view of another embodiment of a blade assembly. FIG. 7 is a side view of an embodiment of a blade assembly 700. This embodiment is useful for a propeller.

The blade assembly 700 includes a planetary gear shaft 703 secured to an upper end unit 714. The upper wall 702 extends from the planetary gear 701. An upper bearing 709 and a lower bearing 710 rotatably engage the planetary gear shaft 703. A transmitting gear 705 engages a receiving gear 706. In preferred embodiment, the transmitting gear 705 and the receiving gear 706 have an equal diameter. The blade assembly 700 also includes a blade shaft 707 secured to an upper end unit 713. An upper bearing 711 and a lower bearing 712 rotatably engage the blade shaft 707 secured to the blade 708.

Figure 8:
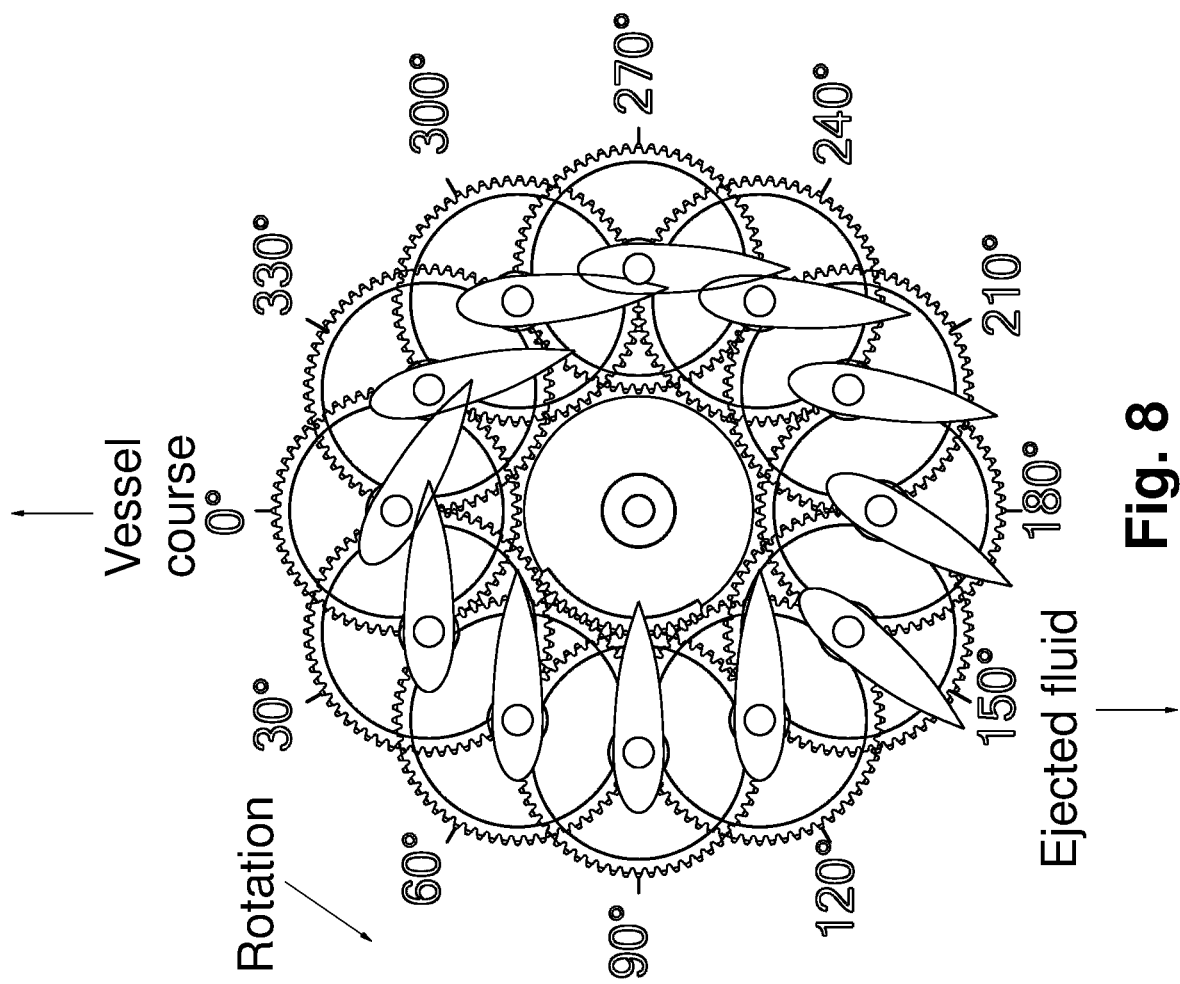
FIG. 8 is a top view of an embodiment of a blade control mechanism with the blades at various angles when the planetary gears rotate around a sun gear. This embodiment is useful for a propeller.

FIG. 8 is a top view of an embodiment of the blade control mechanism for a propeller that uses the 1-to-1 inline reverse gear box. FIG. 8 simulates a planetary gear at various angles (e.g., 30°, 60°, 90°, etc.) as it rotates counterclockwise around a sun gear. In the embodiment, the sun gear has ¾ of the teeth removed. When the planetary gear engages the sun gear teeth, the turbine blade changes its angle with respect to the sun gear. Preferably, the planetary gear and sun gear have equivalent diameters. Thus, when the planetary gear rotates 30° with respect to the sun gear, the 1-to-1 inline reverse gear box 509 reverses the turbine blade 30°. This relationship continues so the turbine blade will not rotate as the planetary gear moves counterclockwise from 30° to 120° to maximize ejected fluid. When the turbine blade freely rotates to minimize drag as the planetary gear rotates from 120° to 30° counterclockwise, since the smooth circumference of the sun gear is disengaged from planetary gear as it rotates.

FIG. 9A is a side view of an embodiment of a blade assembly 500. The blade assembly 500 includes a planetary gear shaft 503 secured to upper end unit 506. The upper wall 502 extends from the planetary gear 501. An upper bearing 504 rotatably engage the planetary gear shaft 503. The turbine blade 508 is secured to the reverse output gear 511 of a 1-to-1 inline reverse gear box 509 and the lower end unit 507. The 1-to-1 inline reverse gear box 509 reverses the rotation of the planetary gear shaft 503 with respect to the rotation of the turbine blade 508.

The 1-to-1 inline reverse gear box 509 shown in FIG. 9B reverses rotation by engagement of an input gear 510, a reverse output gear 511, a left transmit gear 512, and a right transmit gear 513.

Another embodiment relates to the blade control mechanism which has a sun gear in the center to interface a plurality of surrounding blade assemblies, each blade assembly comprises a planetary gear interface to the sun gear, an axis and a blade attached to the axis. Preferably, the sun gear has equal diameter as the planetary gear, but with at least 50% circumference of its teeth removed, the circumference with teeth removed can be referred to the free circumference and the teeth remaining circumference is called the controlled circumference.

In an embodiment, the blade control mechanism is adapted to install on a rotor. The blade control mechanism uses a sun gear to control the surrounding planetary gears of blade assemblies. The circumference with sun gear teeth removed is called the free circumference and the teeth remaining circumference is called the controlled circumference. Each blade assembly comprises a planetary gear that interfaces with the sun gear, an axis, and a blade attached to the axis. For blade assemblies within the controlled circumference, their planetary gears are driven by the sun gear and their blades advance the angle of attack toward the incident stream with increasing fluid (e.g., air). For blade assemblies within the free circumference, planetary gears and blades are free to rotate. Each blade has a center of pressure in its tail section and will be forced to align with the incident fluid stream by the tail section center of pressure and slip through the fluid with minimum drag.

Alternatively, the vertical turbines can be viewed as operating in passive mode or active mode. In passive mode, the blade control mechanism of the vertical turbine generates maximum differential torque from hydro or wind energy by optimizing the downstream torque and minimizing the upstream resistance. In an active mode, the blade control mechanism of the vertical turbine, now functions as a propeller generating unidirectional propulsion with minimum turbulences.

When the vertical turbine is in a passive mode, it receives maximum downstream torque in the circumference with teeth and it leaves blades free to rotate in the circumference without teeth for minimum upstream drag. When the vertical turbine is in an active mode, it converts the rotational blades into parallel movement and unidirectional propulsion with minimum turbulence.

This specification describes various embodiments. The subject matter may be embodied in other forms. Various known materials can be used to manufacture the parts of vertical turbines such as metal, stainless steel, and/or fiberglass. Accordingly, the present disclosure is illustrative, but not limiting, of the scope, which is set forth in the following claims.

What is claimed:

1. A vertical turbine, comprising:
   a shaft;
   a rotor adapted to rotate on the shaft;
   a blade control mechanism that includes:
   a sun gear adapted to rotate on the shaft, wherein the sun gear has teeth removed on part of the circumference;
   a direction control pulley secured to the sun gear;
   a plurality of blade assemblies rotatably on the rotor, each blade assembly including:
   a planetary gear; and
   a blade coupled to the planetary gear, wherein the planetary gears engage the sun gear teeth and disengage from the sun gear on part of the circumference without teeth.

2. The vertical turbine of claim 1, further comprising an output pulley attached to the rotor to drive a generator.

3. The vertical turbine of claim 1, wherein the sun gear has at least half of the teeth removed on part of the circumference.

4. The vertical turbine of claim 1, wherein each planetary gear has an upper wall and the sun gear has an entry clutch for braking upon contact of the upper wall at the start of engagement and an exit clutch for releasing the planetary gear at disengagement.

5. The vertical turbine of claim 1, wherein each blade assembly maximizes torque when the sun gear engages the planetary gear and minimizes drag when the sun gear disengages from the planetary gear.

6. The vertical turbine of claim 1, wherein the direction control pulley secured to the sun gear is positioned with respect to fluid direction to maximize power generated at the output pulley.

7. The vertical turbine of claim 1, wherein the blade is aligned along an axis that defines a leading surface area and tail surface area, wherein the tail surface area exceeds the leading surface area.

8. The vertical turbine of claim 1, wherein the diameter of the sun gear is equal to the diameter of each of planetary gear.

9. The vertical turbine of claim 1, wherein the shaft is stationary.

10. The vertical turbine of claim 1, wherein the sun gear has at least three fourths of the teeth removed on part of the circumference.

11. The vertical turbine of claim 10, wherein the shaft is secured to the rotor.

12. The vertical turbine of claim 11, wherein the blade is a propeller blade that ejects fluid when shaft secured on the rotor is driven.

13. The vertical turbine of claim 12, each blade coupled to the planetary gear includes a transmitting gear secured to the planetary gear that engages a receiving gear secured to the blade.

14. The vertical turbine of claim 13, wherein the diameter of the transmitting gear is equal to the diameter of receiving gear.

\* \* \* \* \*